US012773792B2

(12) United States Patent
Liao

(10) Patent No.: US 12,773,792 B2
(45) Date of Patent: Oct. 27, 2026

(54) CYCLIC SWITCHING ELECTRIC SUCTION CUP

(71) Applicant: Chin-hui Liao, Taichung City (TW)

(72) Inventor: Chin-hui Liao, Taichung City (TW)

(*) Notice: Subject to any disclaimer, the term of this patent is extended or adjusted under 35 U.S.C. 154(b) by 1075 days.

(21) Appl. No.: 17/947,163

(22) Filed: Sep. 18, 2022

(65) Prior Publication Data

US 2024/0091960 A1 Mar. 21, 2024

(51) Int. Cl.

*B25J 15/06* (2006.01)
*B25B 11/00* (2006.01)
*F16B 47/00* (2006.01)
*H01H 35/24* (2006.01)

(52) U.S. Cl.

CPC ......... *B25J 15/0683* (2013.01); *B25B 11/007* (2013.01); *B25J 15/0633* (2013.01); *F16B 47/00* (2013.01); *H01H 35/245* (2013.01)

(58) Field of Classification Search

CPC ....... B25J 15/0633; F16B 47/00; H01H 35/24
See application file for complete search history.

(56) References Cited

U.S. PATENT DOCUMENTS 4,445,341 A * 5/1984 Hayashi ............... B60H 1/3208 62/133
5,795,001 A * 8/1998 Burke .................. B65G 49/061 294/185
11,207,458 B2 * 12/2021 Locke ................ H01H 35/2614
2006/0231705 A1 * 10/2006 Liu ......................... F16B 47/00 248/205.5

FOREIGN PATENT DOCUMENTS

EP 0173304 A2 * 3/1986 ............. H01H 35/34
KR 20190031897 A * 3/2019 ............. F16B 47/00

OTHER PUBLICATIONS

Translation, Specificaiton KR-20190031897-A, Mar. 27, 2019, FIT Database (Year: 2026).*

* cited by examiner

*Primary Examiner* — Victoria P Augustine
*Assistant Examiner* — Ralph D Wilkinson
(74) *Attorney, Agent, or Firm* — Ying-Ting Chen

(57) ABSTRACT

A cyclic switching electric suction cup is provided. The electric suction cup includes a suction member and an actuating member. The actuating member includes an air extraction motor, a power supply, a control panel and a locking sleeve. When an air chamber is in the non-vacuum mode, one end of the locking sleeve abuts against a first switch to activate the air extraction motor and perform air extraction. During the air extraction, the air in the locking sleeve is simultaneously extracted and the locking sleeve elastically shrinks and deforms. After the air extraction is completed and the air chamber is in the vacuum mode, the end of the locking sleeve abutting against the first switch is gradually distant from the first switch so that the air extraction motor stop extraction. The actuating member repeats this cycle when the air chamber is in the non-vacuum mode.

7 Claims, 16 Drawing Sheets

CYCLIC SWITCHING ELECTRIC SUCTION CUP

FIELD OF THE DISCLOSURE

The present disclosure relates to a cyclic switching electric suction cup, particularly to the technology used in the field of suction, and more particularly to the purpose of fixedly suction on smooth surfaces such as glasses and car roofs and to prevent the suction cup from falling off.

BACKGROUND OF THE DISCLOSURE

The suction cup provides a stably mounting for the carrier. The most common suction cup is made of rubber and has a translucent cone shape. However, the conventional suction cup often falls off. When the suction cup is firmly attached, the space between the suction cup and the object surface is in a vacuum state. As long as slight air enters the space where the suction cup and the object surface are attached, the suction cup will be deformed and expanded. At this time, the vacuum state will gradually disappear, the atmospheric pressure between the suction cup and the object's surface will become the same as outside, and the suction cup will easily fall off, resulting in the item positioned by the suction cup falling.

The suction cup described above can be applied in many different fields, for example, the root racks mounted on the car roof by the suction cups. If the suction cups fall off, the items carried on the roof racks, or even the roof racks, would easily fly off during driving, leading to dangerous occurrences. Therefore, in using the device, it is essential to carefully prevent the occurrence of the above problems and dangers.

SUMMARY OF THE DISCLOSURE

The main objective of the present disclosure is to improve the stability or the suction cup and avoid air entering that affects the firmness of the suction. As mentioned in the conventional technology, the air will gradually enter the general suction cup when the suction time is too long, resulting in the lack of firmness between the suction cup and the surface of the object, so that the Suction cup would easily fall off. The present disclosure is aimed at improving the defects in conventional art.

The present disclosure provides a cyclic switching electric suction cup, including an actuating member and an actuating member. The suction member includes an assembly side, a suction side, a first guide hole and a second guide hole; wherein the suction side is movably attached to the outer surface of the object and forms an air camber between the object; the first guide hole and the second guide hole penetrate from the assembly side to the suction side and communicate with the air chamber correspondingly. The actuating member is mounted on the assembly side of the suction member, and the actuating member includes an air extraction motor, a power supply, a control panel and a locking sleeve. In which, the power supply is electrically connected with the suction motor and the control panel, the control panel controls the on and all of the air extraction motor, and the air extraction motor is connected to an air extraction pipe communicated with the first guide hole, one end of the locking sleeve is adjoining to and movably abutting against a first switch or the control board, and the other end of the locking sleeve is assembled to the second guide hole.

When the power supply outputs power to operate the control panel and the air extraction motor, the air chamber is in the non-vacuum mode, one end of the locking sleeve abuts against the first switch to activate the air extraction motor and perform air extraction; when the air extraction motor extracts the air in the air chamber through the air extraction pipe, the air in the locking sleeve is simultaneously extracted and elastically shrinks and deforms, after the air extraction in the air chamber is completed and the air chamber is in a vacuum mode, and the end of the locking sleeve abutting against the first switch is gradually distant from the first switch, so that the air extraction motor stops extraction, and the actuating member repeats this cycle when the air chamber is in the non-vacuum mode.

BRIEF DESCRIPTION OF THE DRAWINGS

The described embodiments may be better understood by reference to the following description and the accompanying drawings in which.

DETAILED DESCRIPTION OF THE EXEMPLARY EMBODIMENTS

Figure 1:
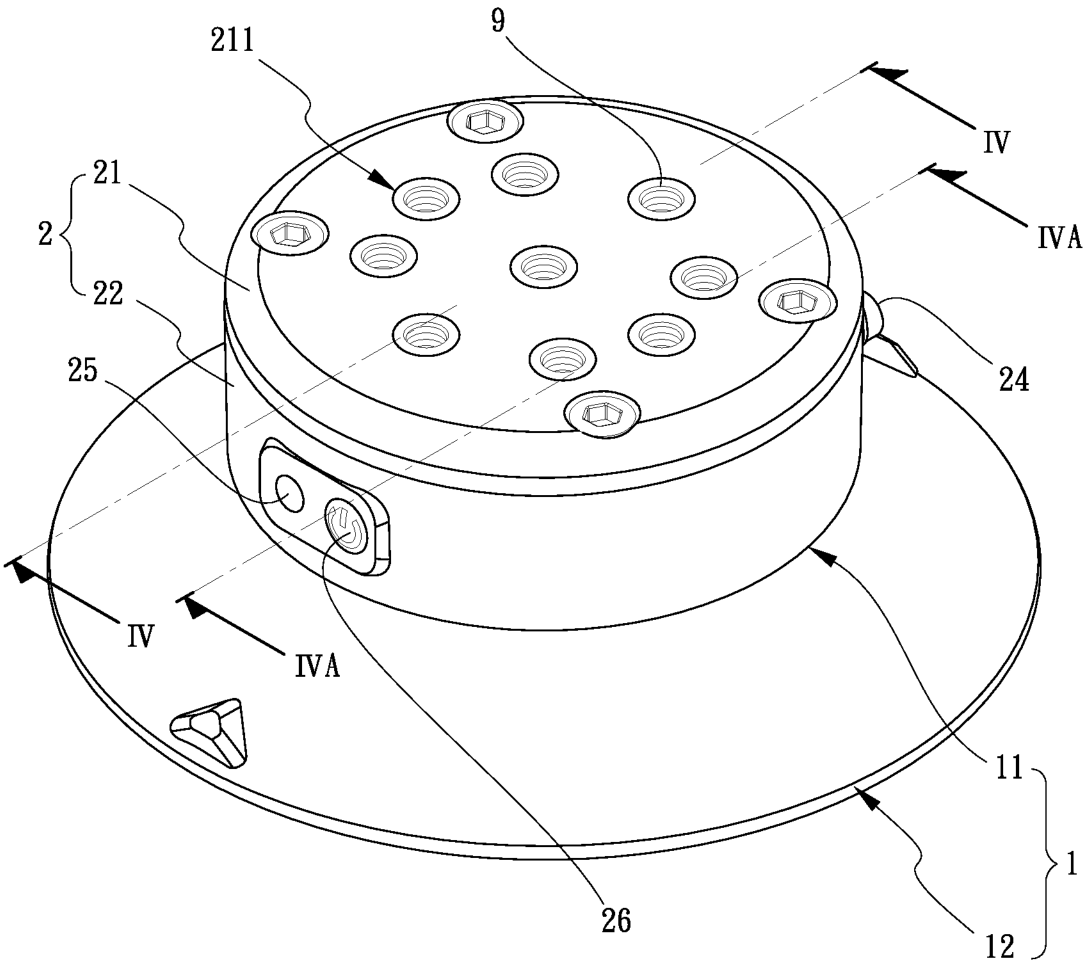
FIG. 1 is a perspective schematic view of one embodiment of the present disclosure.
Figure 2:
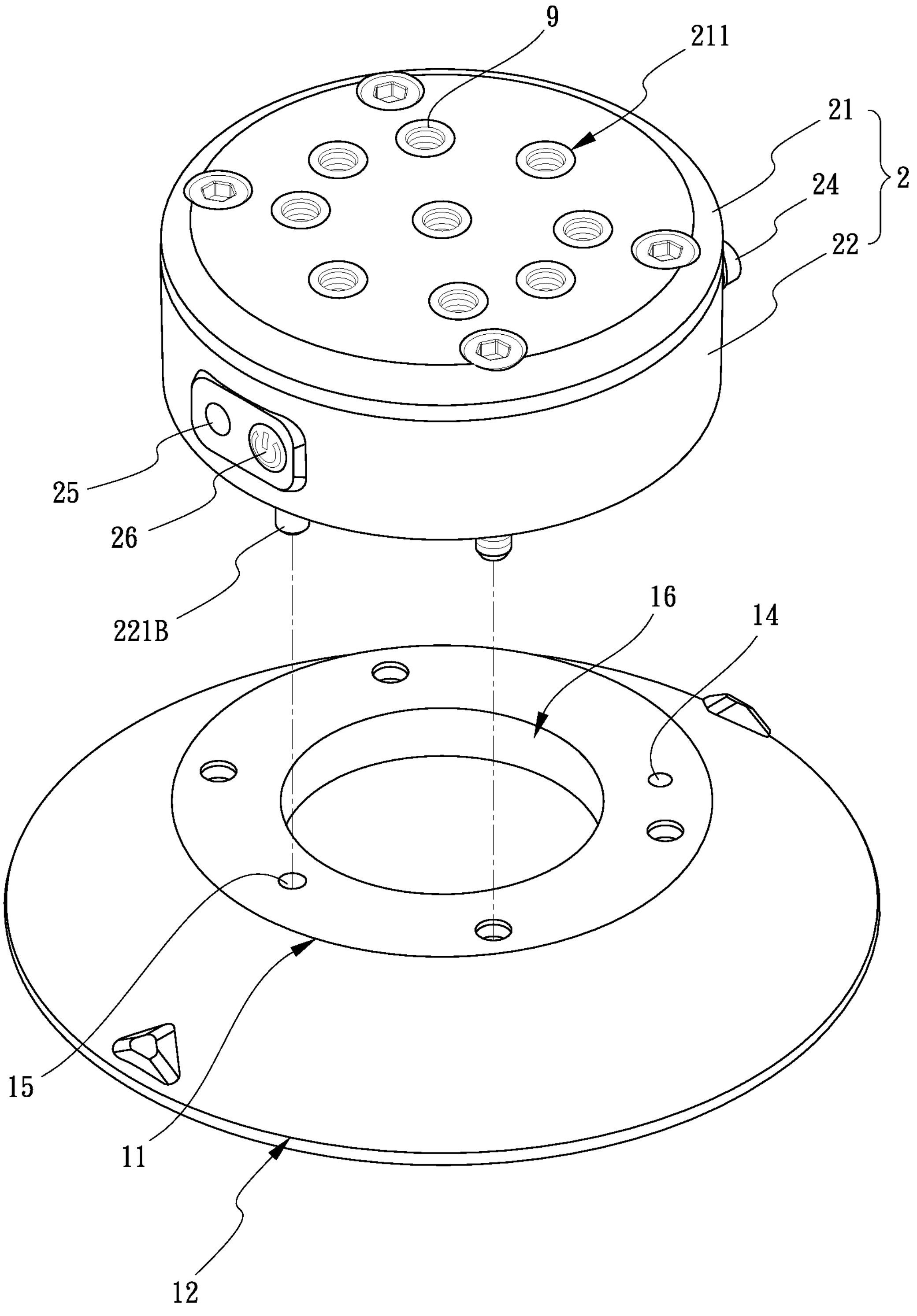
FIG. 2 is a perspective schematic view of a suction member and an actuating member of the present disclosure.

The construction and method of operation of the present disclosure, together with additional objects and advantages thereof, will be best understood from the following description of one or more embodiment(s) when read in connection with the accompanying drawings.

It is to be acknowledged that, although the terms 'first', 'second', 'third', and so on, may be used herein to describe various elements, these elements should not be limited by these terms. These terms are used only for the purpose of distinguishing One component from another component. Thus, a first element discussed herein could be termed a second element without altering the description of the present disclosure. As used herein, the term "or" includes any and all combinations of one or more of the associated listed items.

Referring to FIGS. 1-7, the present disclosure provides a cyclic switching electric suction cup used on an object 100 to be sucked such as glass, the car roof, etc. The electric suction cup of the present disclosure includes a suction member 1 and an actuating member 2. The suction member 1 is trumpet-shaped and includes an assembly side 11 and a suction side12, the suction side 12 is movably sucked on the outer surface of the object 100 and fibrins an air chamber 13 between the object 100, the first guide hole 14 and the second guide hole 15 penetrate from the assembly, side 11 to the suction side 12 and communicate with the air chamber 13 correspondingly. The actuating member 2 is mounted on the assembly side 11 of the suction me member 1, the actuating member 2 includes an air extraction motor 3, a power supply 4, a control panel 5 and a locking sleeve 6. The power supply 4 is electrically connected with the suction motor 3 and the control panel 5, the control panel 5 controls the on and off of the air extraction motor 3, and the air extraction motor 3 is connected to an air extraction pipe 7 communicated with the first guide hole 14, one end of the locking sleeve 6 is adjoining to and movably abutting against a first switch 51 of the control board 5, and the other end of the locking sleeve 6 is assembled to the second guide hole 15.

As shown in FIGS. 5-7A, in practice, the air chamber 13 has air inside and is in a non-vacuum state when the user starts to attach the electric suction cup of the present disclosure on the outer surface of the object 100. When the power supply 4 is activated, the air extraction motor 3 and the control panel 5 both obtain power and start to operate. When the air extraction motor 3 activates to extract the air in the air chamber 13. The suction side 12 and the locking sleeve 6 will gradually deform due to the structure that the first guide hole 14 and the second guide hole 15 are communicated with the air chamber 13.

At the beginning, one end of the locking sleeve 6 is abutted against a first switch 51. With the deformation of the locking sleeve 6, the locking sleeve 6 will be gradually distant from and released abutting against the first switch 51. When the air in the air chamber 13 is completely extracted and the air chamber 13 is in a vacuum state, the locking sleeve 6 is ultimately released from the abutment of the first switch 51, the first switch 51 will turn off the operation of the air extraction motor 3, and the air extraction motor 3 will be stand-by. Further, when the air gradually enters the air chamber 13, the suction side 12 and the locking sleeve 6 will reset immediately. Once one end of the locking sleeve 6 is reset to abut/press the first switch 51 (At this time, there is still some suction force between the suction side 12 and the object 100), the air extraction motor 3 which is controlled by the control panel 5 can be awoken and restart to extract the air in the air chamber 13, and causes the locking sleeve 6 shrink and deform again. By repeating the movements mentioned above, even if the air enters the air chamber 13, the air extraction motor 3 can be started quickly, which prevents the suction cup from falling off due to insufficient suction force after the air enters, so that the electric suction cup of the present disclosure can be attached on the object 100 for a long time. Compared with conventional suction cups, the electric suction cup of the present disclosure can maintain firm suction for a longer time.

As shown in FIG. 2 and FIGS. 4-7A, in order to make the deformation of the suction member 1 more rapid and reliable, the suction member 1 has certain technical features. The suction member 1 further includes a buffer groove 16 on the assembly side 11, and the buffer groove 16 curves inward on the suction side 12; when the suction side 12 of the suction member 1 is tightly attached to the object 100, the inner wall of the air chamber corresponding to the buffer groove 16 is adjoining to the surface of the object 100, so that the suction member 1 is tightly attached on the surface of the object 100. The actuating member 2 further includes an upper cover 21 and a bottom case 22. The upper cover 21 is assembled with the bottom case 22 to form the container 23, the air extraction motor, the power supply, the control panel and the locking sleeve are installed in the container. The lower side of the bottom case 72 further includes a first through pipe 221A and a second through pipe 221B, the first through pipe 221A has one end extending toward the container 23 and the other end penetrating out of the bottom case 22 and inserted into the first guide hole 14, and the second through pipe 221B has one end extending toward the container 23 and the other end penetrating out of the bottom case 42 and inserted into the second guide hole 15, so that the first through pipe 221A and the second through pipe 221B are communicated with the air chamber 13. Therefore, the operation of the air extraction motor 3 allows the air in the air chamber 13 to flow into the first through pipe 221A via the first guide hole 14, and through the air extraction pipe 7 into the air extraction motor 3 then exhausted. At the same time, the air in the locking sleeve 6 will be exhausted through the second through pipe 221B and the second guide hole 15 to the air chamber 13, then the air will be exhausted along with the air in the air chamber 13. With this feature, the abutting/pressing against the first switch 51 by the locking sleeve 6 is gradually released, so that the air extraction motor 3 does not need to operate for long time and the service life of the air extraction motor 3 can be maintained.

Further, the air extraction motor 3, the power supply 4, the control panel 5 and the locking sleeve 6 are installed in the container 23. The bottom case 22 has an openable door 24 located corresponding to the power supply 4, the power supply 4 can be loaded into or took out from the container 23 through the door 24. For example, the power supply 4 can be mercury batteries, rechargeable batteries, etc. In one embodiment of the present disclosure, the power supply 4 is battery and also provided with corresponding accessories. The use of examples anywhere in this specification, including examples of any terms is illustrative only, and in no way limits the scope and meaning of the present disclosure or of any exemplified term.

Figure 3:
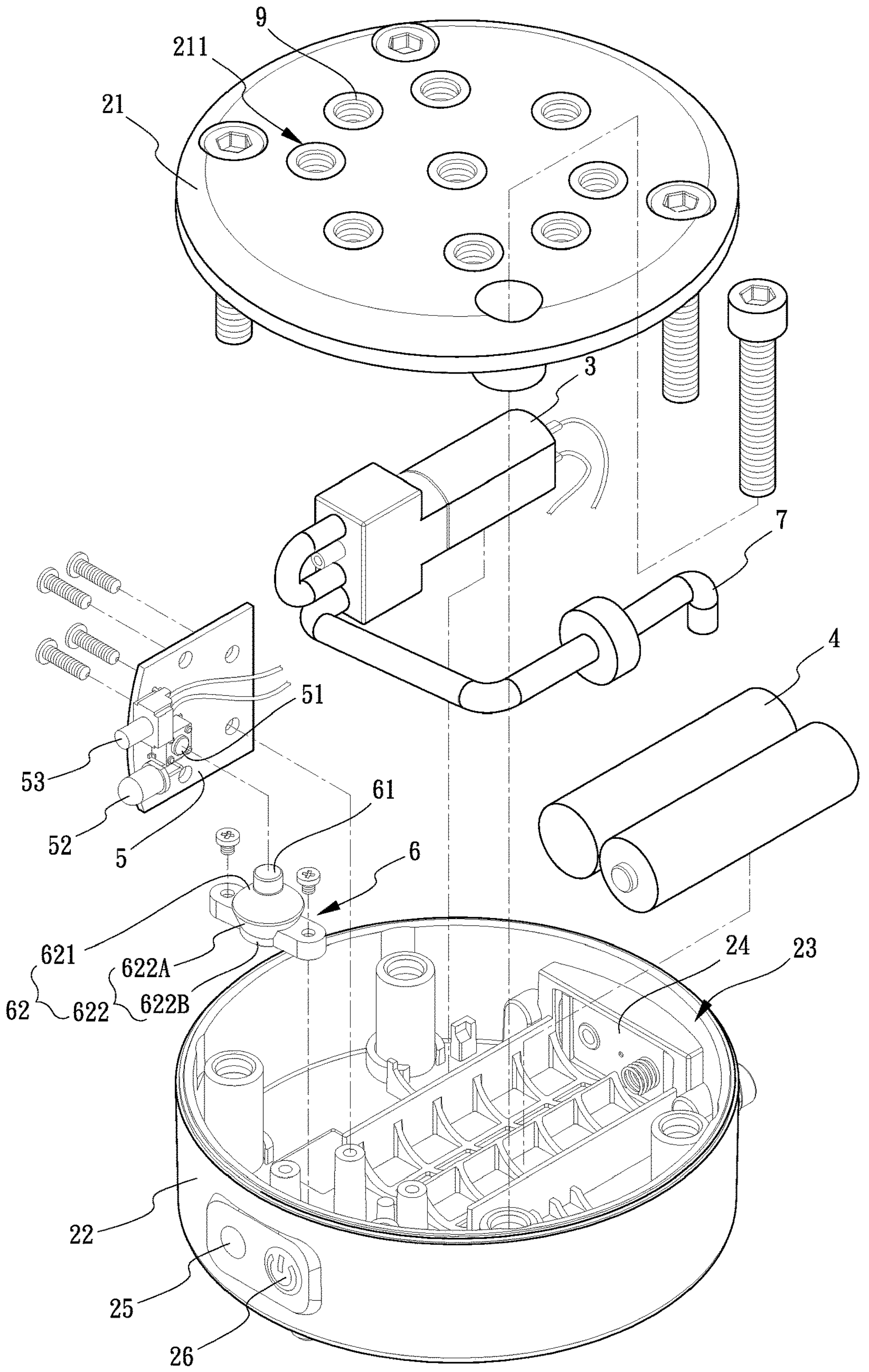
FIG. 3 is an exploded perspective schematic view of the actuating member and the internal components thereof of the present disclosure.
Figure 4:
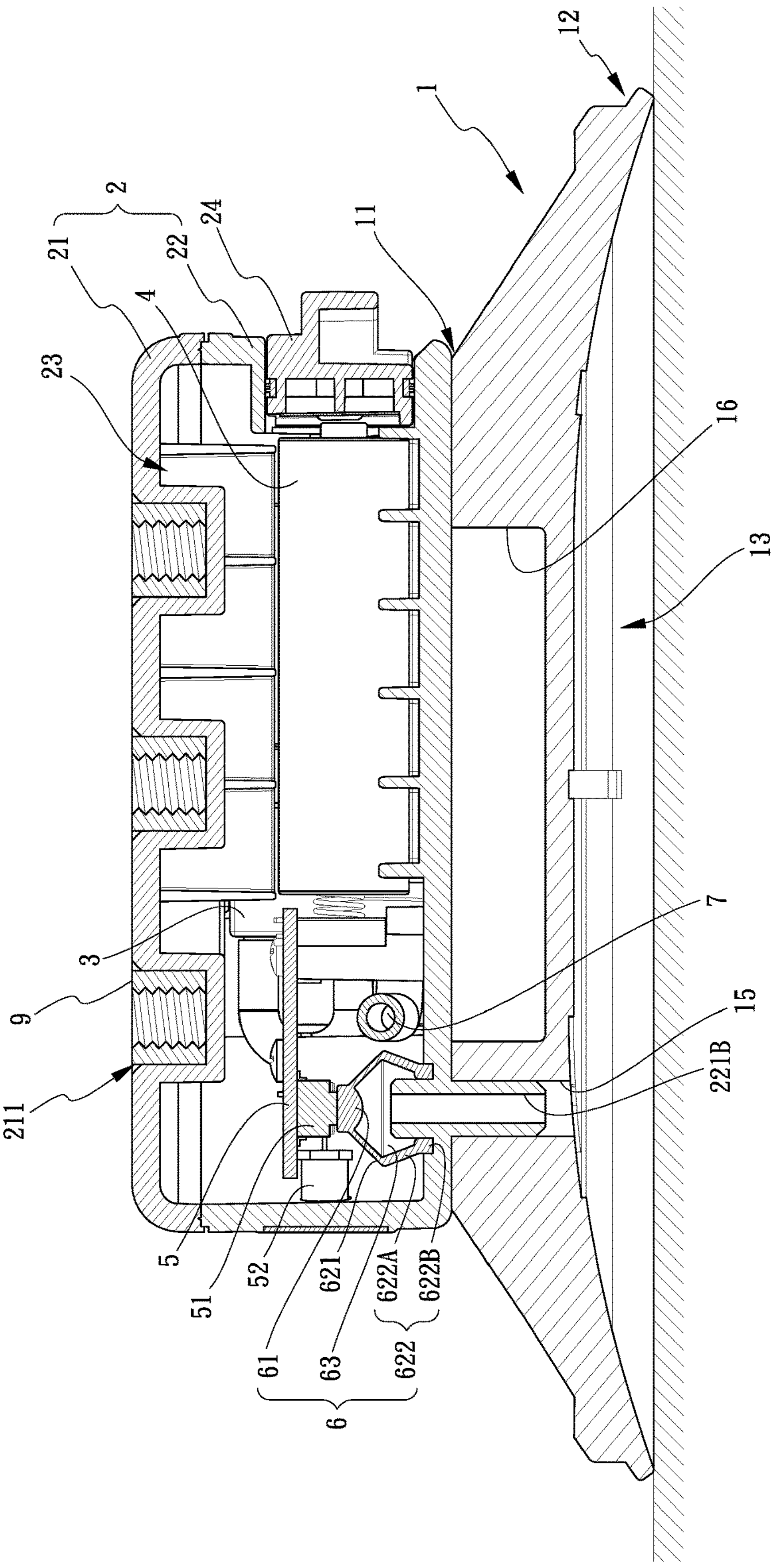
FIG. 4 is a sectional schematic view of line IV-IV of FIG. 1.
Figure 4A:
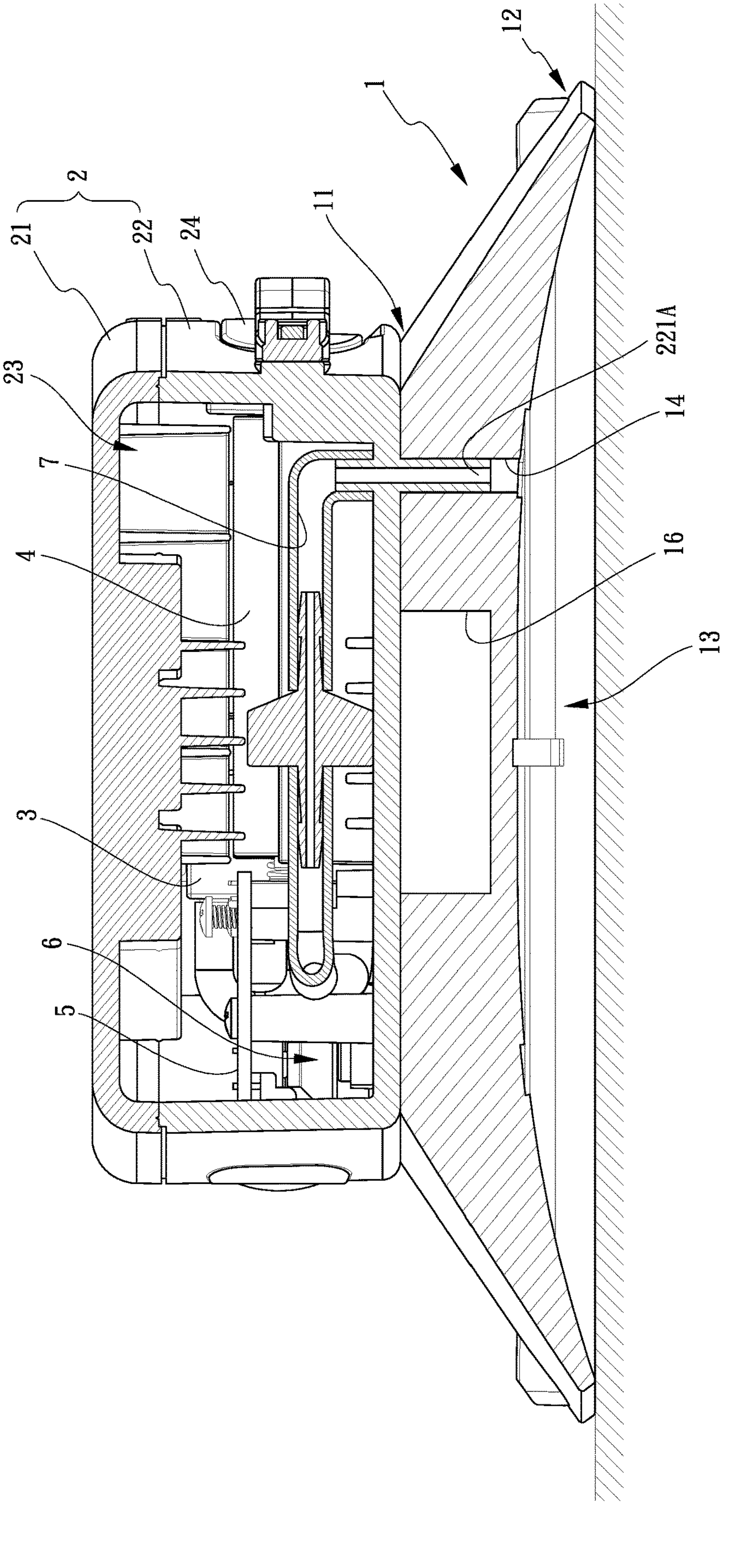
FIG. 4A is a sectional schematic view of line IVA-IVA of FIG. 1.
Figure 5:
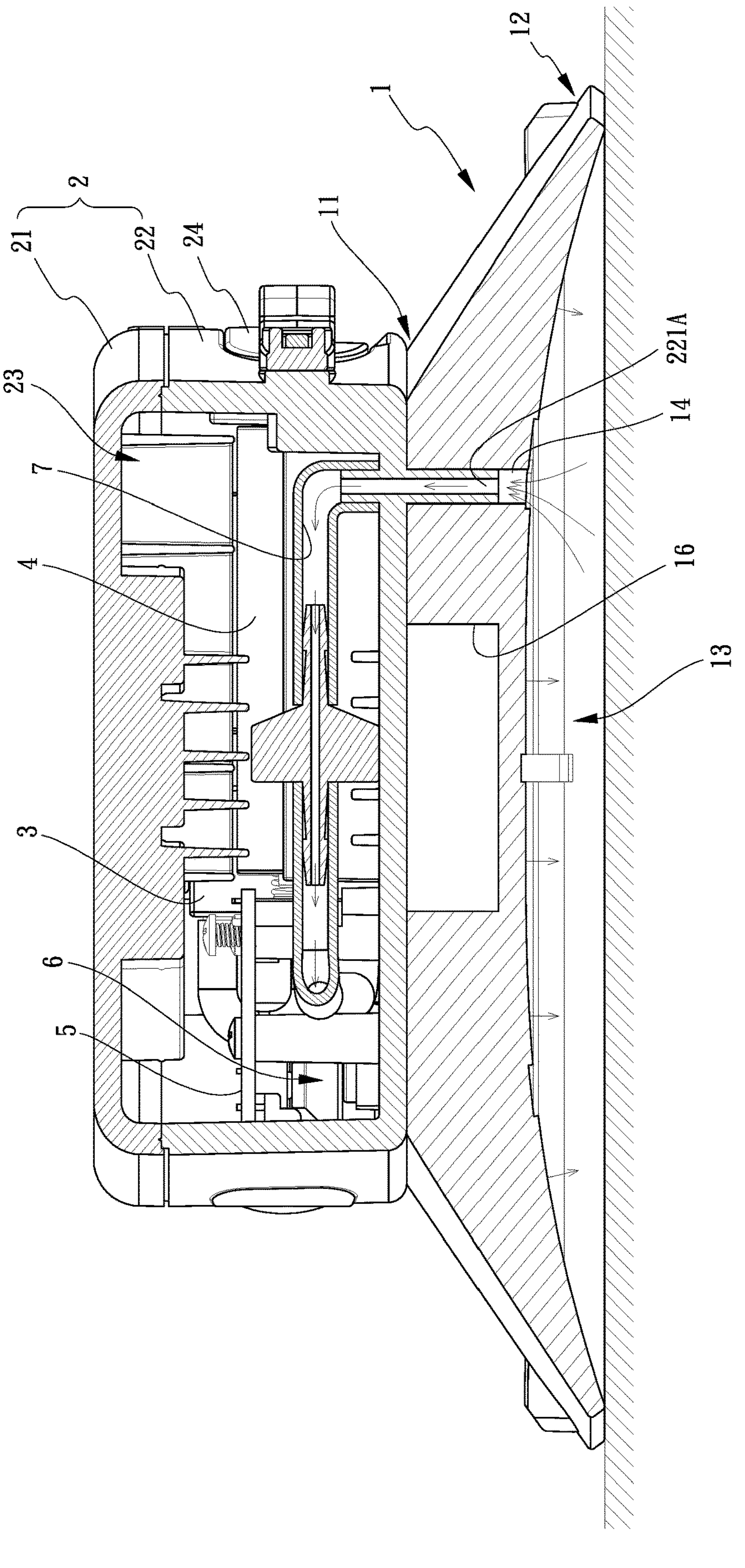
FIG. 5 is a schematic view of FIG. 4A that the air in the air chamber flows into the first guide hole when the air extraction motor is operating.
Figure 6:
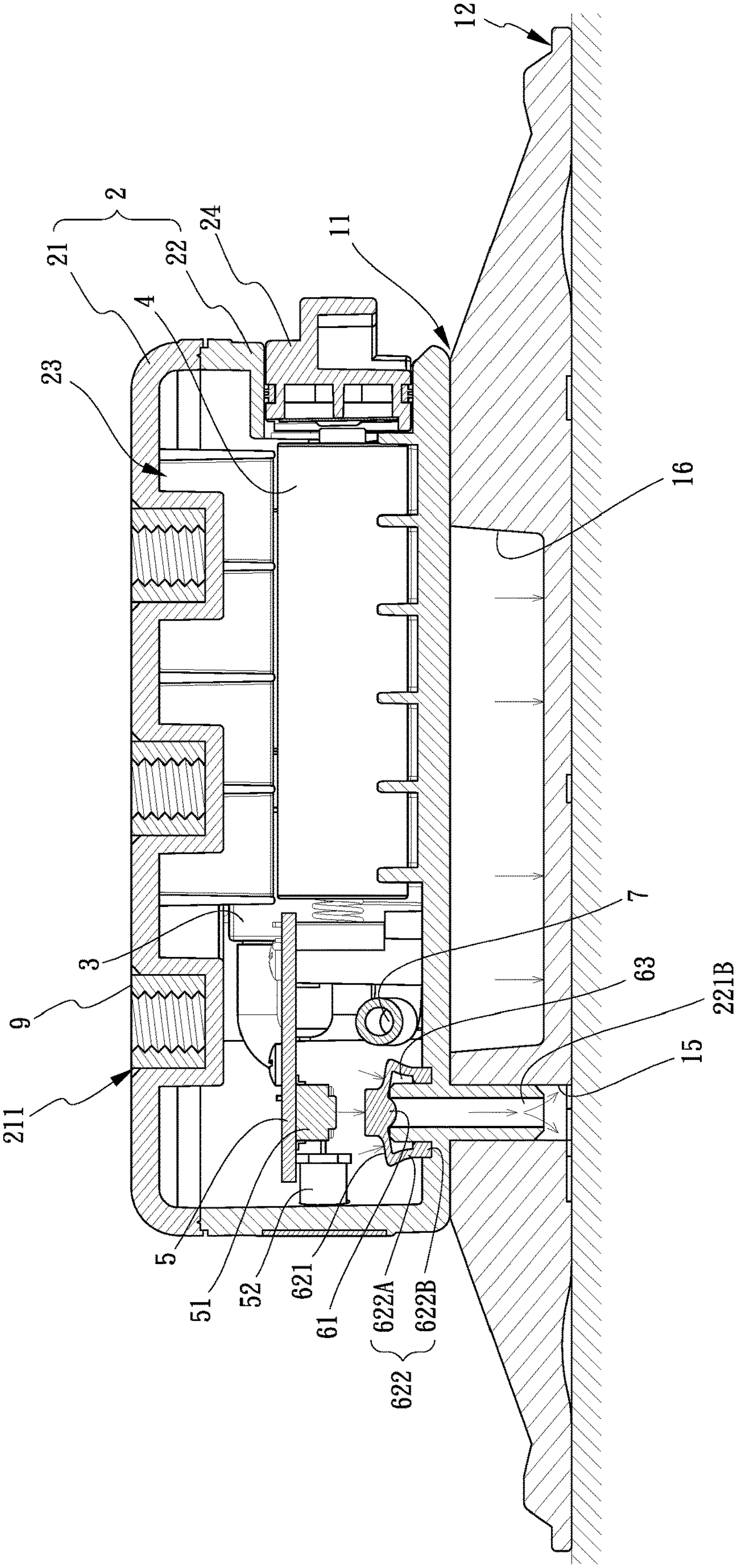
FIG. 6 is a schematic view of the deformation of the suction side after the air extraction motor extracts the air in the air chamber.
Figure 6A:
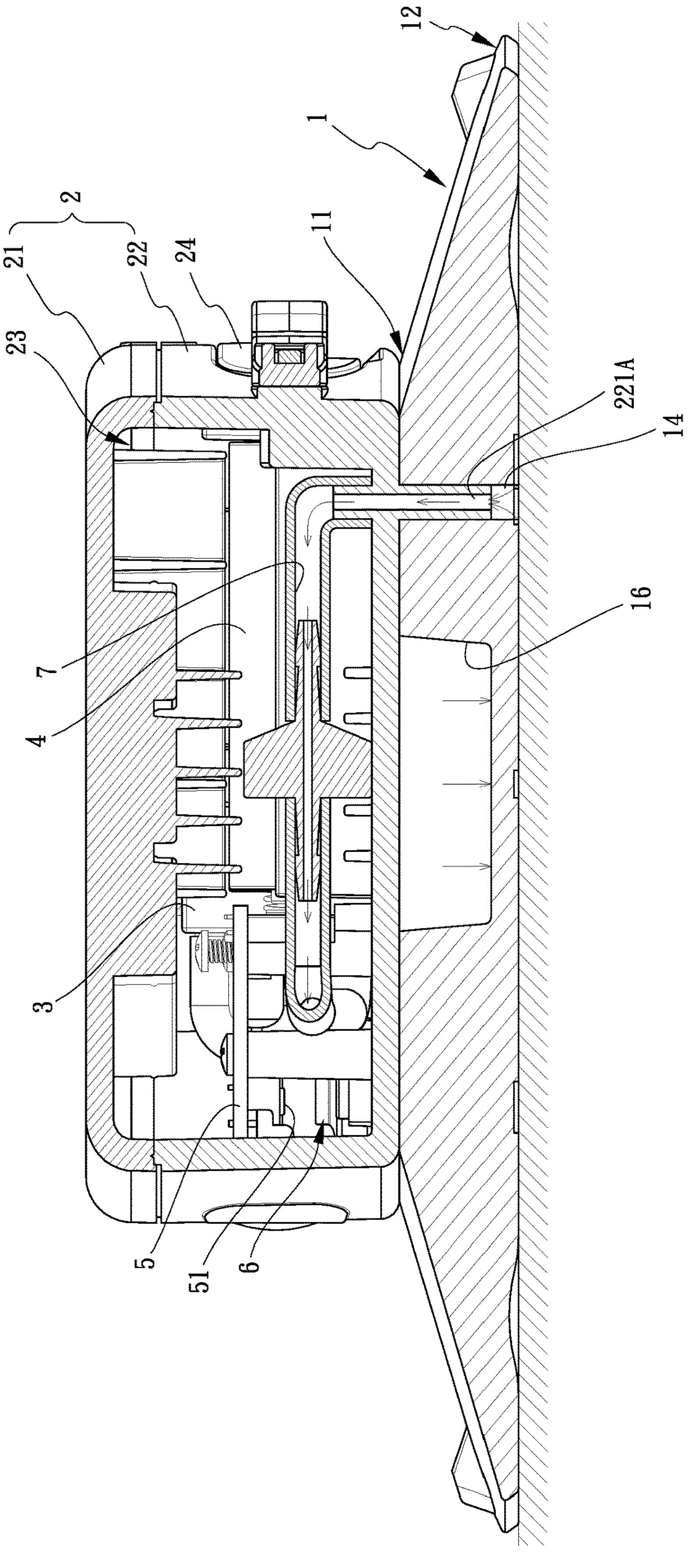
FIG. 6A is a schematic view of FIG. 4A that the deformation of the locking sleeve after the air extraction motor extracts the air in the air chamber.
Figure 7:
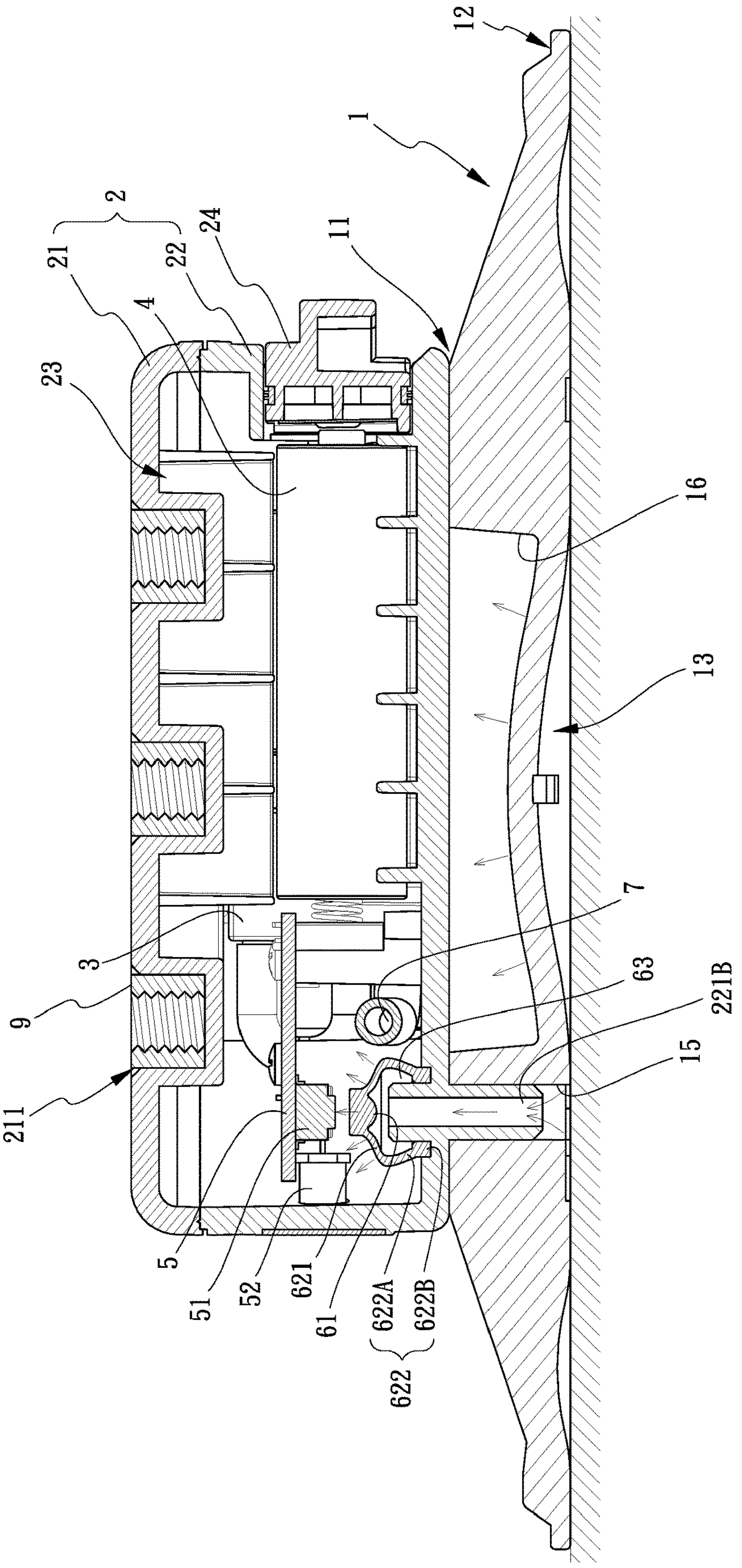
FIG. 7 is a schematic view of FIG. 6 that the suction side is gradually reset when the air enters the air chamber.
Figure 7A:
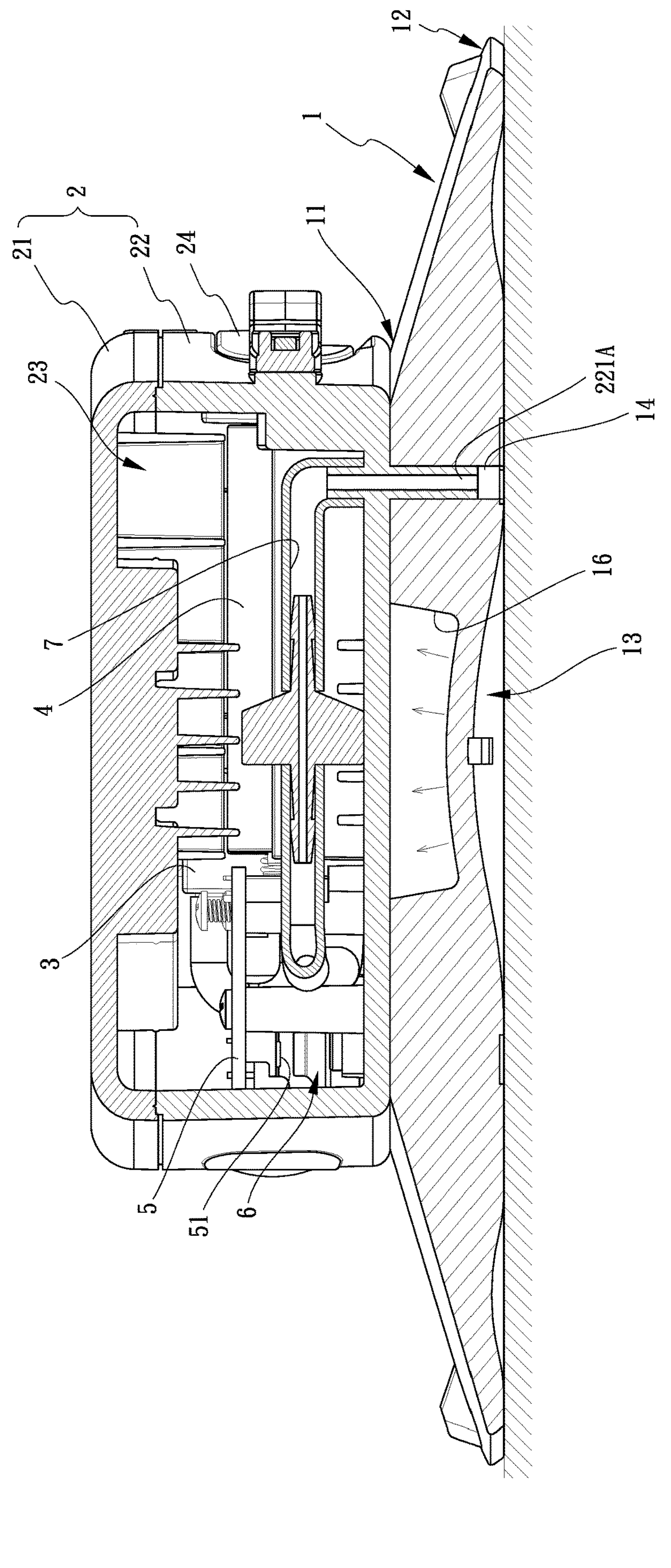
FIG. 7A is a schematic view of FIG. 6A when air enters the air chamber of the locking sleeve is gradually reset.
Figure 8:
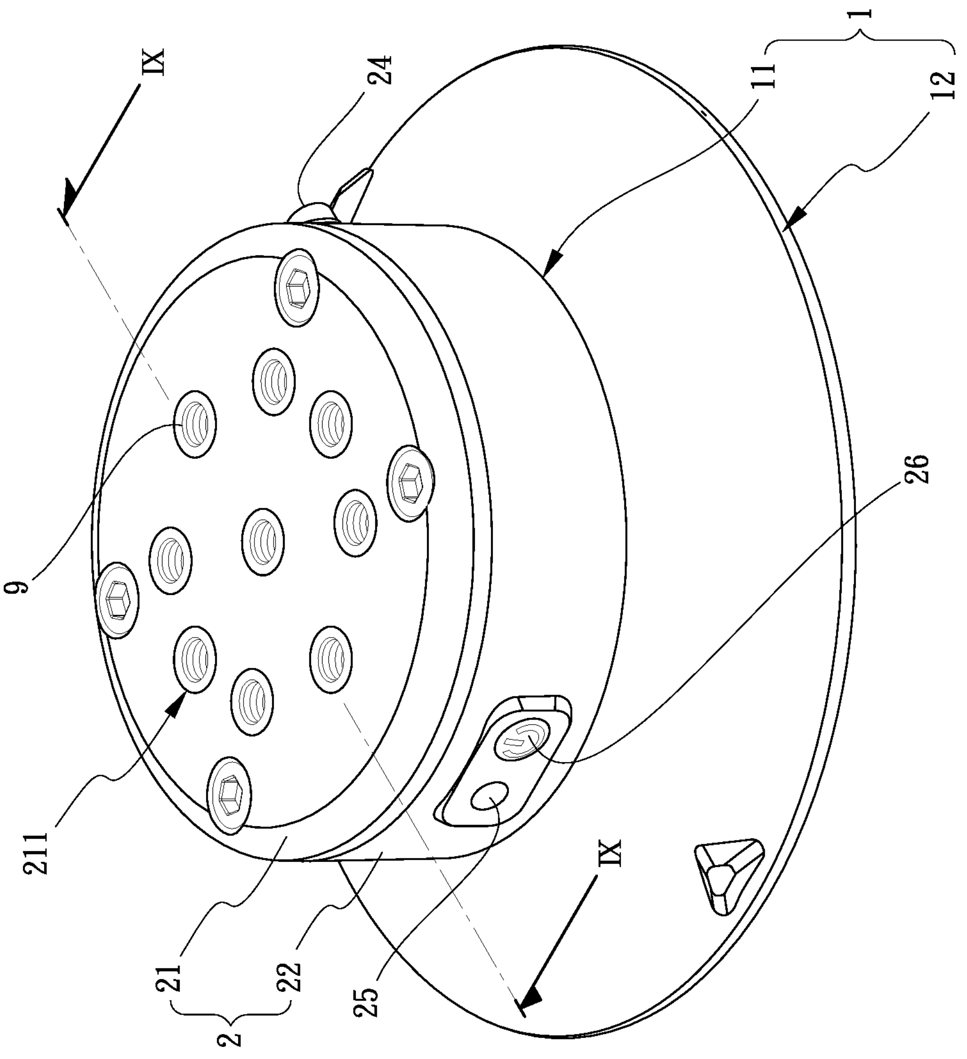
FIG. 8 is a schematic perspective view of another embodiment of the present disclosure.
Figure 9:
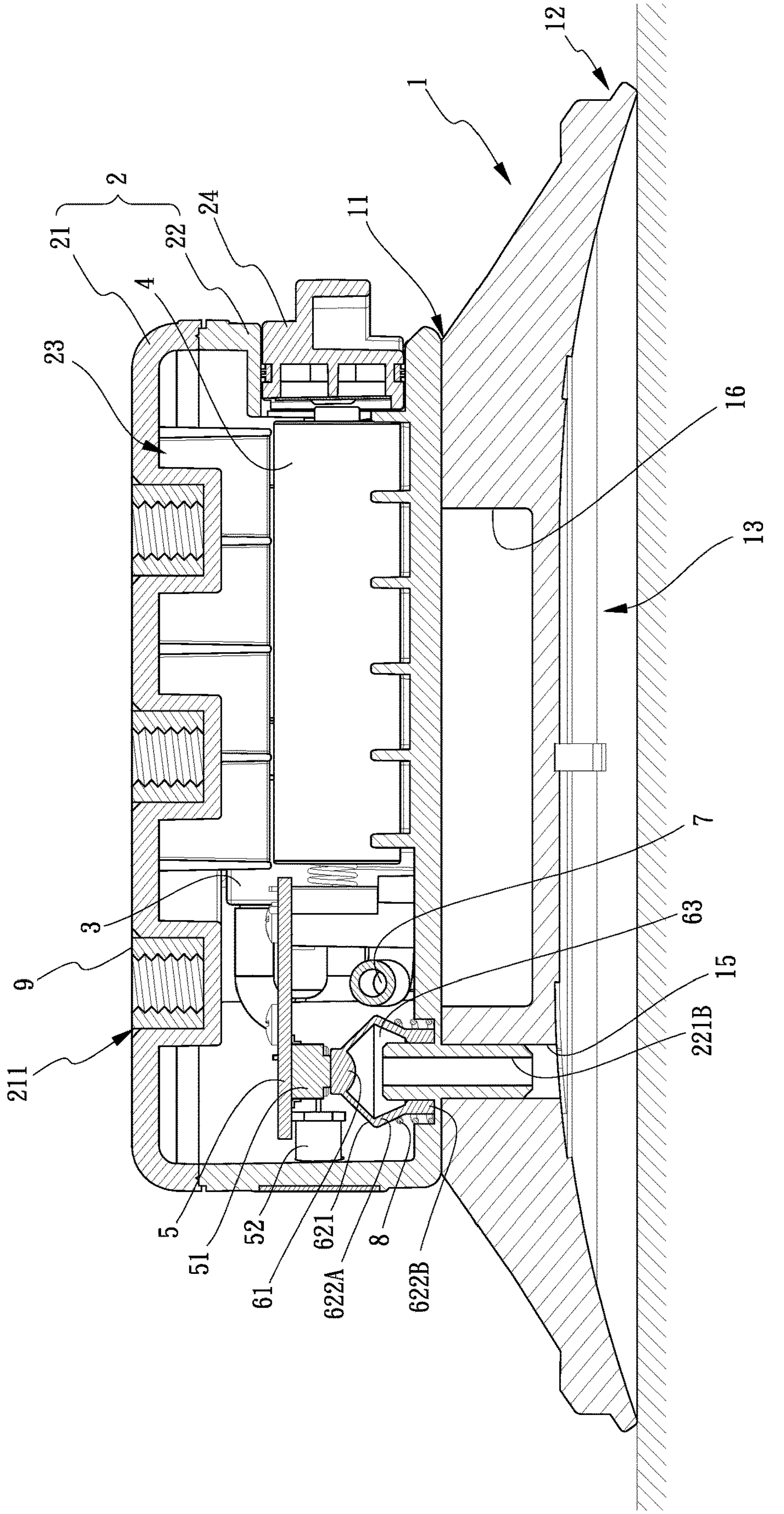
FIG. 9 is a sectional schematic view of line IX-IX of FIG. 8.
Figure 10:
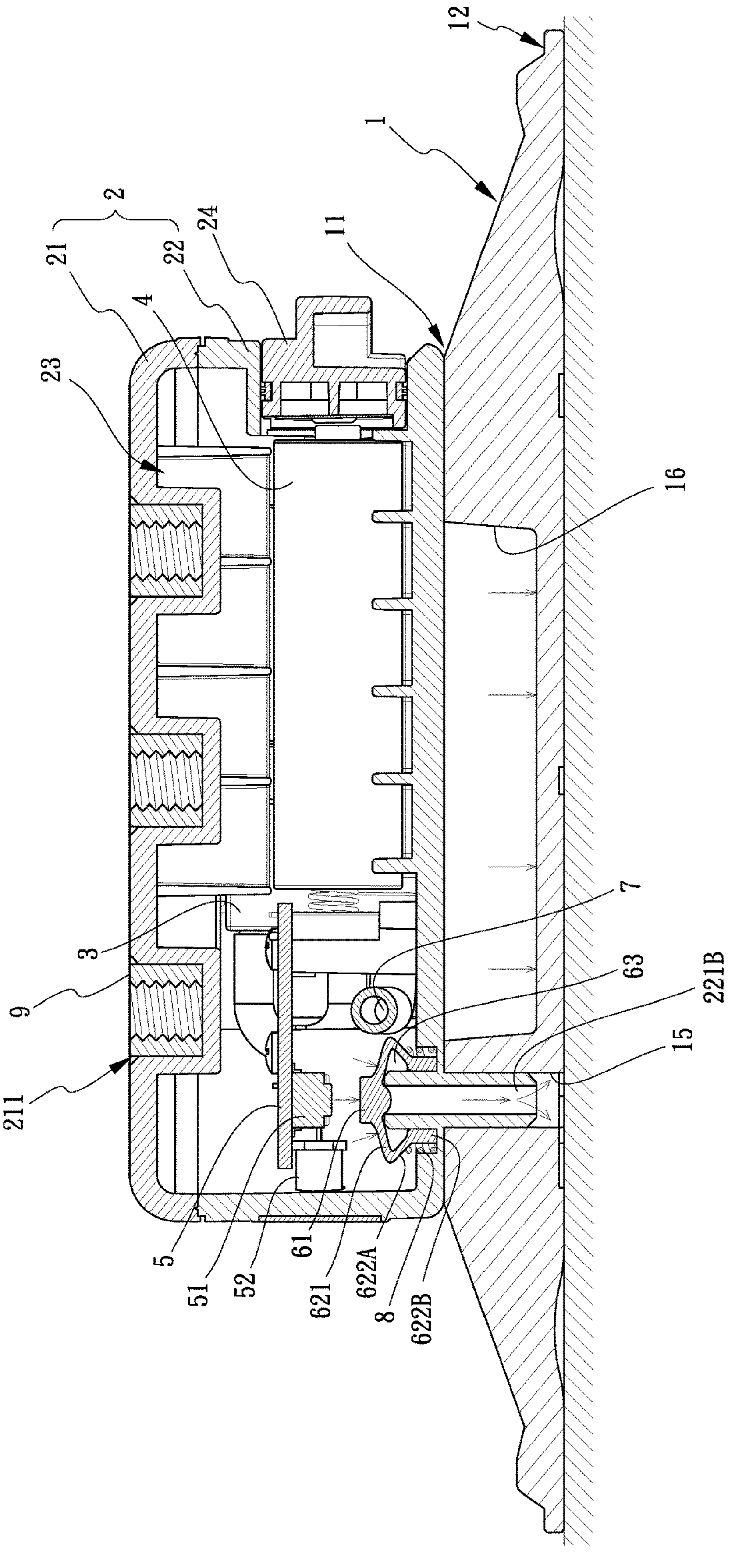
FIG. 10 is a schematic view of FIG. 9 that the deformation of the suction side, the locking sleeve and the spring when the air extraction motor extracts the air from the air chamber.
Figure 11:
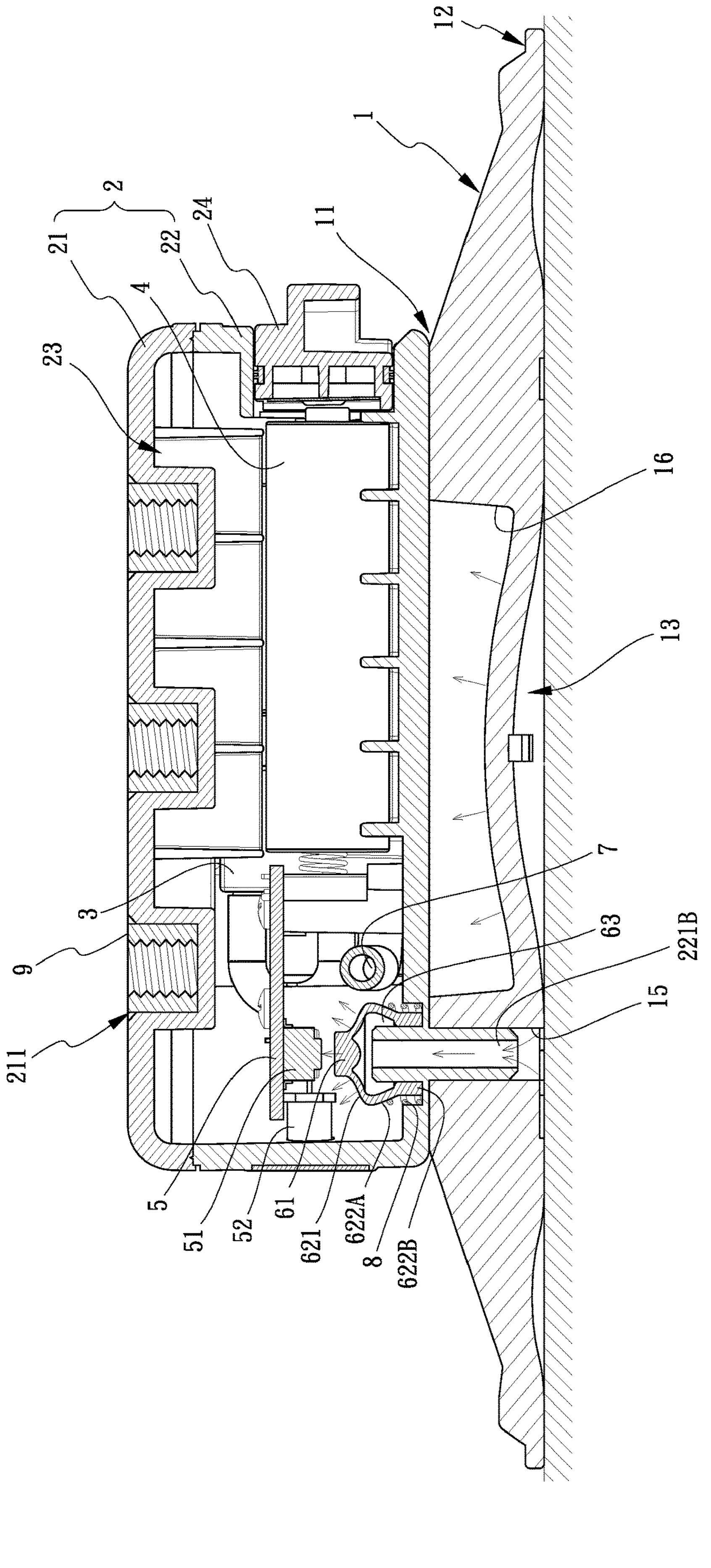
FIG. 11 is a schematic view of FIG. 10 that when air enters the air chamber, the suction side, the locking sleeve and the spring are gradually reset.

Moreover, the control panel 5 includes an indicator light 52 and a second switch 53, in which the indicator light 52 is located corresponding to a light source identification portion 25 of the actuating member 2, and the second switch 53 is located corresponding to an on/off button 26 of the actuating member 2. After the power supply 4 is loaded and the door 24 is closed, the user can press the on/off button 26 to activate the control panel 5 to receive power from the power supply 4. The indicator light 52 will display the power of the power supply 4. Therefore, after the power supply 4 is loaded and the second switch 53 is turned on, the air extraction motor 3 can be directly operated to perform the air extraction, as shown in FIG. 3.

Referring to FIGS. 4-7A, which is the detailed description of the locking sleeve 6 of the present disclosure. The locking sleeve 6 includes a convex top 61 and a deformation portion 62. The deformation portion 62 has a contraction chamber 63. The locking sleeve 6 is sleeved on the second through pipe 221B, the contraction chamber 63 is communicated with the second guide hole 15 and the air chamber 13. The deformation portion 62 includes a first portion 621 and a second portion 622, one end of the first portion 621 is connected to the convex top 61, and the other end of the first portion 621 is connected to one end or the second portion 622, and the other end of the second portion 622 is abutted against the actuating member 2. The first portion 621 is a thin-wall portion, and the second portion 622 is a thick-wall portion. The thickness of the first portion 621 is smaller than the thickness of the second portion 622, and the deformation of the first portion 621 is greater than that of the second portion 622. Therefore, when the air extraction motor 3 performs the air extraction, not only the air in the air chamber 13 will be extracted, but also the air in the contraction chamber 63 will be extracted. During the air extraction, the first portion 621 of the deformation portion 62 will gradually deform and shrink, and the shrinking of the first portion 621 allows the convex top 61 to gradually release the abutting/pressing against the first switch 51. The air in the air chamber 13 is gradually extracted and the air chamber 13 forms a vacuum state. By virtue of the thickness difference of the deformation portion 62, the contact between the convex top 61 and the first switch 51 can be reliably pressed/released. In addition, the deformation portion 62 is made of soft rubber, and the convex top 61 is made of hard rubber, so the deformation portion 62 has better de formability.

Referring to FIGS. 8-11, the present disclosure further provides another embodiment. Firstly, the second portion 622 includes a first section 622A and a second section 622B, the length of the second section 622B is greater than the length of the first section 622A. The second section 622B has a spring 8 assembled on the outer periphery of the second section 622B, one end of the spring 8 is abutted against the outer surface of the first section 622A and the other end of the spring 8 is abutted against the actuating member 2. The purpose of the spring 8 assembled on the outer periphery of the second section 622B is: when the air extraction motor 3 operates the air extraction, the deformation of the deformation portion 62 is relatively slow, which allows more prolonged extraction of the air extraction motor 3 to ensure the air in the air chamber 13 is completely extracted and the air chamber 13 forms a complete vacuum state. When the air gradually enters the air chamber 13, the spring S is elastically compressed and accumulates force. Therefore, when the suction side 12 and the deformation portion 62 of the locking sleeve 6 will reset immediately. The elastic force of the spring 8 is used to speed up the reset of the deformation part 62 to make the convex top 61 abutting/pressing against the first switch 51 quickly. Therefore, it allows the locking sleeve 6 to shrink slowly and reset quickly, to quickly operate the air extraction motor 3, and ensure the suction cup member 1 can be firmly attached to the surface of the object 100.

Figure 12:
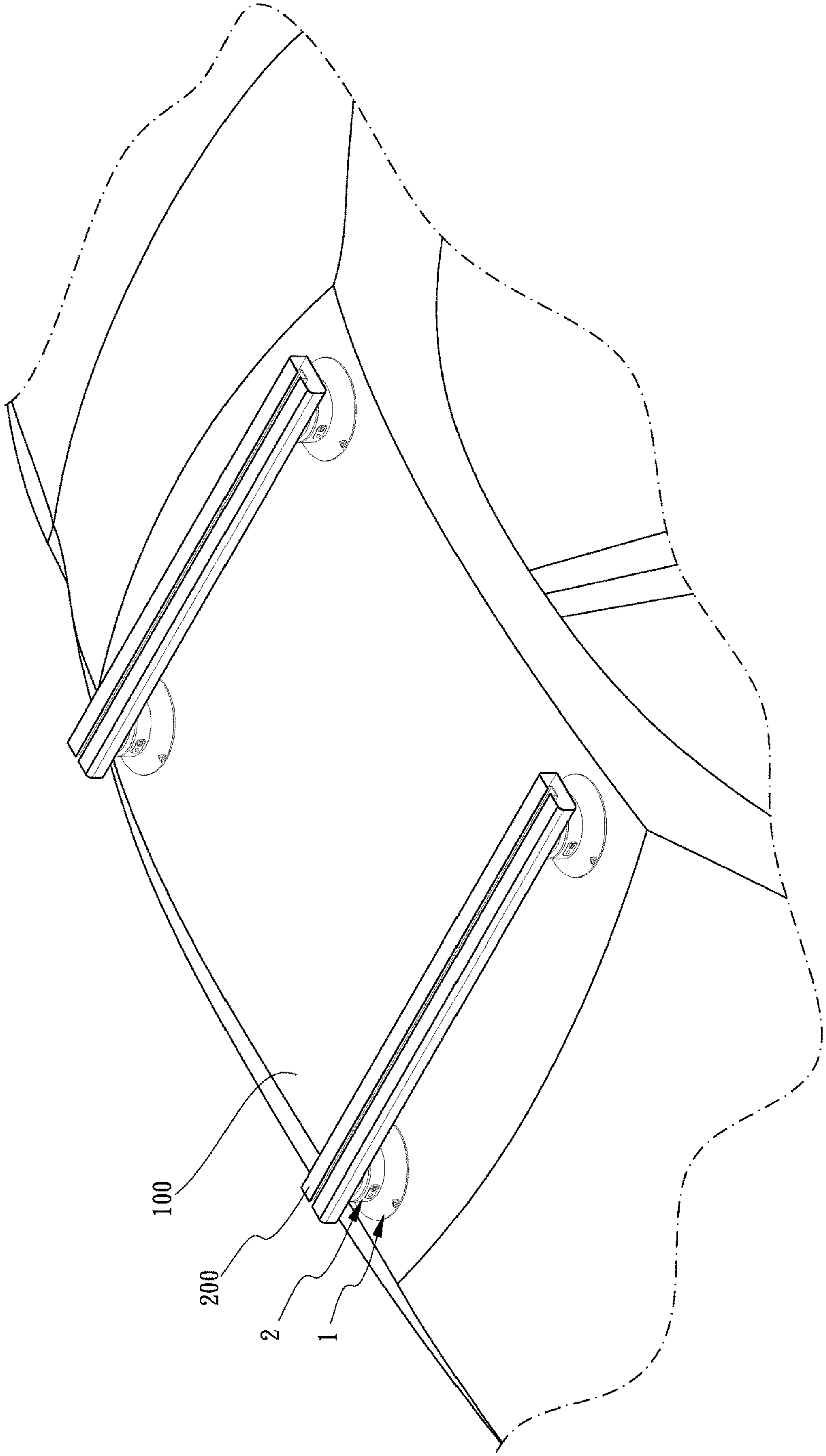
FIG. 12 is a schematic view of the electric suction cups of the present disclosure mounted with roof racks on the car roof.
Figure 13:
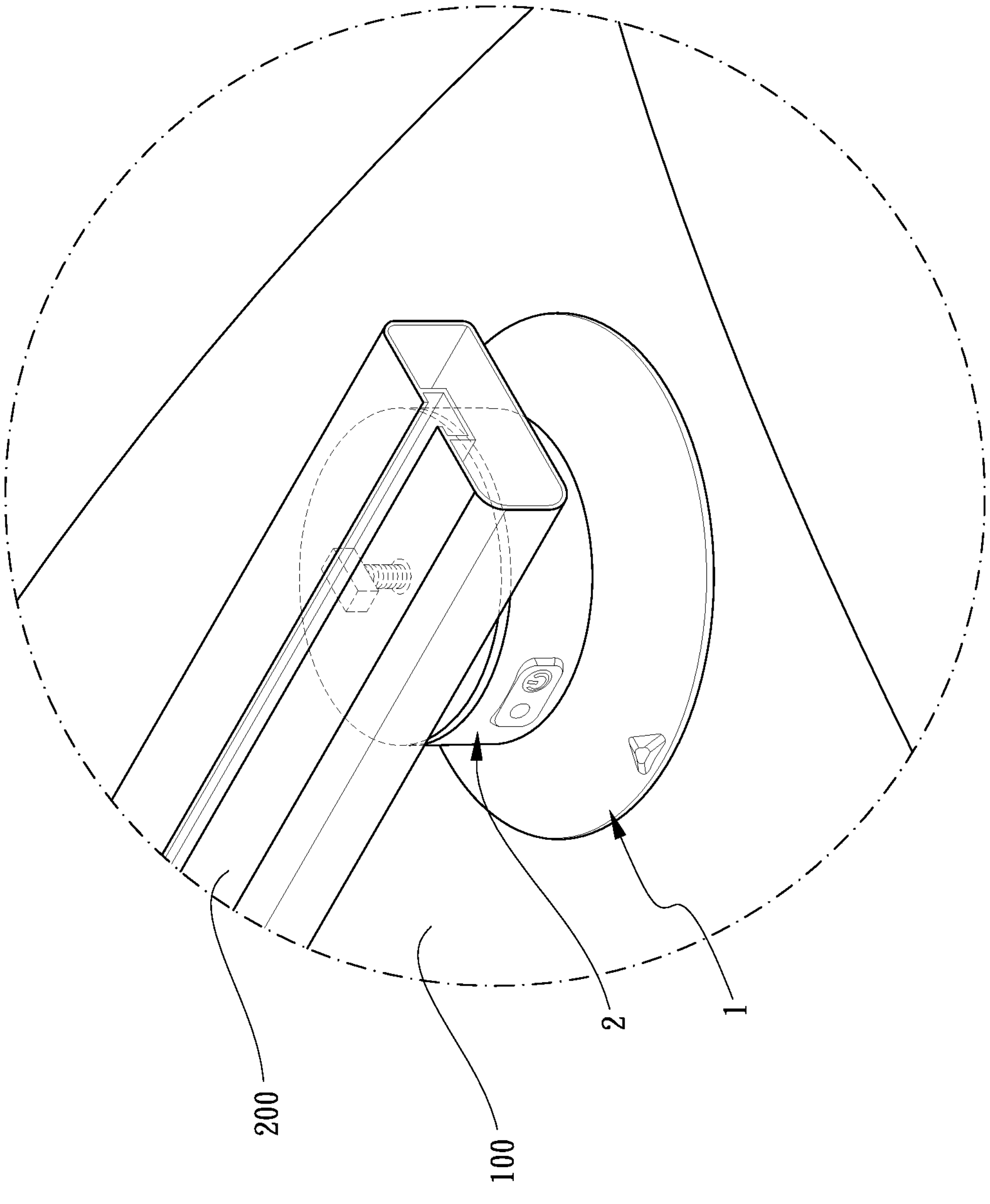
FIG. 13 is a partial enlarged schematic view of FIG. 12.

Lastly, the primary function of the present disclosure is to provide an electric suction cup for firmly carrying items on the object 100. For example, the roof rack 200 can be mounted on the ear roof to place huge items. In addition to the large items that must be securely bundled and fixed, the mounting of the roof rack 200 is also one of the critical points. Therefore, by virtue of the suction member 1, the actuating member 2 and the features of the air extraction motor 3 and the locking sleeve 6, the suction member 1 can be firmly attached to the surface of the object 100 (car root) for a long time. Referring to FIGS. 12 and 13, which is to be read in conjunction with FIG. 1, a plurality of assembly holes 211 are provided on the upper cover 21 of the actuating member 2, and a plurality of fasteners 9 are respectively embedded in the plurality of assembly holes 211. For example, the fastener 9 of the present disclosure is a nut, and the user can use a bolt or other threaded fasteners to assemble the roof racks. Further, the plurality of assembly holes 211 of the upper cover 21 are evenly spaced apart to provide more suitable positions fir mounting different items. Thus, the electric suction cup of the present disclosure can be applied to different items.

What is claimed is:

1. A cyclic switching electric suction cup, comprising:

a suction member, including an assembly side, a suction side, a first guide hole and a second guide hole; wherein, the suction side is movably sucked on the outer surface of the object to be sucked and forms an air camber between the object; wherein the first guide hole and the second guide hole penetrate from the assembly side to the suction side and are communicated with the air chamber correspondingly; and an actuating member, mounted on the assembly side of the suction member; wherein the actuating member includes an air extraction motor, a power supply, a control panel and a locking sleeve; wherein, the power supply is electrically connected with the air extraction motor and the control panel, the control panel controls the on and off of the air extraction motor, and the air extraction motor is connected to an air extraction pipe, and the air extraction pipe is communicated with the first guide hole; wherein one end of the locking sleeve is adjoining to and movably abutted against a first switch of the control board, and the other end of the locking sleeve is assembled to the second guide hole;

wherein, when the power supply outputs power to operate the control panel and the air extraction motor, the air chamber is in a non-vacuum mode, and one end of the locking sleeve is abutted against the first switch to activate the air extraction motor to extract; when the air extraction motor extracts the air in the air chamber through the air extraction pipe, the air in the locking sleeve is simultaneously extracted and the locking sleeve elastically shrinks and deforms, so that the locking sleeve shrinks slowly and resets quickly to start the air extraction motor; after the air extraction in the air chamber is completed and the air chamber is in a vacuum mode, the end of the locking sleeve abutting against the first switch is gradually distant from the first switch, so that the air extraction motor stop extraction, and repeat this cycle when the air chamber is in the non-vacuum mode;

wherein the locking sleeve includes a convex top and a deformation portion having a contraction chamber; wherein the contraction chamber is communicated with the air chamber through the second guide hole, the deformation portion is made of soft rubber, and the convex top is made of hard rubber;

wherein the deformation portion includes a first portion and a second portion, one end of the first portion is connected to the convex top, and the other end of the first portion is connected to the second portion; one end of the second portion is connected to the first portion, and the other end of the second portion is attached against the bottom case; the thickness of the first portion is smaller than the thickness of the second portion; the deformation of the first portion is greater than that of the second portion, the first portion and the second portion have different material properties and thickness differences, so that the deformation portion can achieve the slowest shrinkage and the fastest reset.

2. The cyclic switching electric suction cup according to claim 1, wherein the assembly side of the suction member further includes a buffer groove, when the suction side of the suction member is tightly attached to the object, the inner wall of the air chamber corresponding to the buffer groove is adjoining to the surface of the object.

3. The cyclic switching electric suction cup according to claim 1, wherein the control panel includes an indicator light and a second switch; wherein the indicator light is located corresponding to a light source identification portion of the actuating member, and the second switch is located corresponding to an on/off button of the actuating member; wherein the on/off button is used for truing on or off the power supply, and the indicator light is used for showing the status of the power supply.

4. The cyclic switching electric suction cup according to claim 1, wherein the actuating member further includes a container, the container includes a first through pipe and a second through pipe; wherein the first through pipe has one end extending toward the container and the other end penetrating out of the bottom case and inserting into the first guide hole, and the second through pipe has one end extending toward the container and the other end penetrating out of the actuating member and inserting into the second guide hole; wherein one end of the air extraction pipe is sleeved on the first guide hole, and the locking sleeve is sleeved on the second guide hole.

5. The cyclic switching electric suction cup according to claim 4, wherein the actuating member further includes an upper cover and a bottom case, the upper cover is assembled with the bottom case to form the container; wherein the air extraction motor, the power supply, the control panel and the locking sleeve are installed in the container; wherein the bottom case has an openable door located corresponding to the power supply for loading the power supply.

6. The cyclic switching electric suction cup according to claim 5, wherein the upper cover includes a plurality of assembly holes, and a plurality of fasteners are embedded in the plurality of assembly holes respectively.

7. The cyclic switching electric suction cup according to claim 1, wherein the second portion includes a first section and a second section, the length of the second section is greater than the length of the first section; the second section has a spring assembled on the outer periphery of the second section; wherein one end of the spring is abutted against the outer surface of the first section and the other end of the spring is abutted against the bottom caser; wherein the elastic force of the spring quickly bounces against the first section and indirectly pushes against the first portion and then resets after deformation, so that the convex top quickly presses against the first switch to start the air extraction motor.

* * * * *